United States Patent [19]

Swiatosz

[11] Patent Number: 5,029,578

[45] Date of Patent: Jul. 9, 1991

[54] OXYGEN BREATHING APPARATUS SIMULATOR

[75] Inventor: Edmund Swiatosz, Maitland, Fla.

[73] Assignee: United States of America as represented by the Secretary of the Navy, Washington, D.C.

[21] Appl. No.: 408,179

[22] Filed: Sep. 15, 1989

[51] Int. Cl.⁵ .......................................... A61M 15/00
[52] U.S. Cl. ........................... 128/202.26; 128/205.12; 128/205.28
[58] Field of Search ....................... 128/202.26, 205.28, 128/205.12; 55/DIG.33, DIG. 35

[56] References Cited

U.S. PATENT DOCUMENTS

| | | | |
|---|---|---|---|
| 3,868,225 | 2/1975 | Tidd | 128/202.26 |
| 4,019,509 | 4/1977 | Li et al. | 128/202.26 |
| 4,154,234 | 5/1979 | Baker | 128/205.12 |
| 4,231,118 | 11/1980 | Nakagawa | 128/201.25 |
| 4,265,238 | 5/1981 | Swiatosz et al. | 128/205.12 |
| 4,807,614 | 2/1989 | van der Smissen et al. | 128/205.12 |

OTHER PUBLICATIONS

"The Universal and the Fireman's Gas masks", by Katz et al., 5/23/23, Technical Paper #300, Dept. of Interior.

Primary Examiner—Aaron J. Lewis
Attorney, Agent, or Firm—Robert W. Adams

[57] ABSTRACT

A breathing bag apparatus and simulator is disclosed that has a circuitous and continuous tube within its bag(s) communicating outside air from an inlet filter and carbon-dioxide-conversion canister to the inhalation fixture of the user's facemask. A permanent carbon-monoxide-conversion cylinder forms part of the path of the tube within the bag(s). The cylinder uses porous ceramic pellets to host a coating of platinum as its catalytic noble metal.

5 Claims, 1 Drawing Sheet

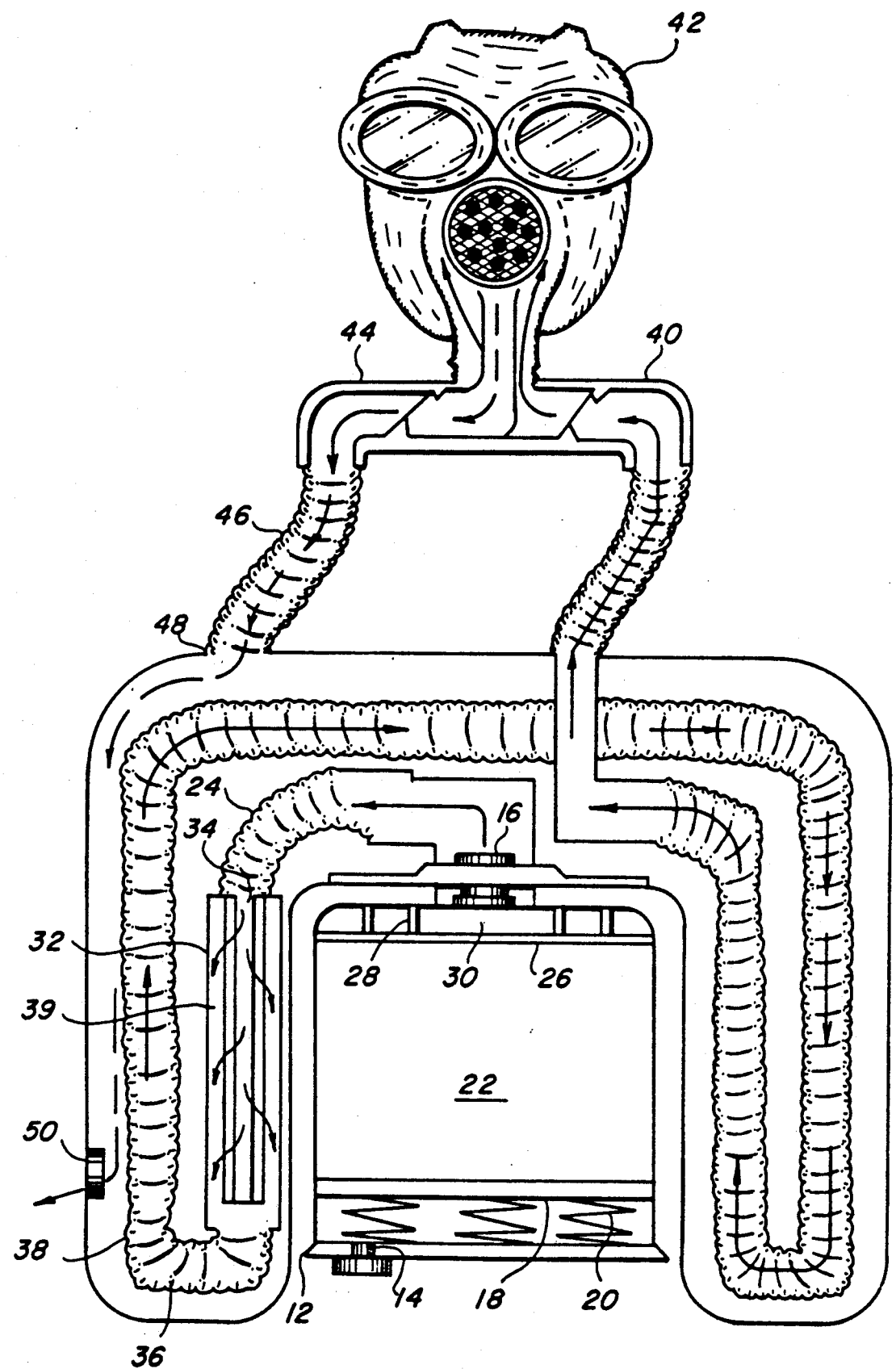
FIGURE

OXYGEN BREATHING APPARATUS SIMULATOR

BACKGROUND OF THE INVENTION

The invention relates to the field of training devices and simulators, and, more specifically, to training in the use and wearing of a supplemental air supply apparatus that involves a face mask and an oxygen source. In particular, the invention relates to a simulated oxygen-generating canister wherein a filter canister simulates in an open-flow system for training purposes, the oxygen generating chemical canister of the closed-flow, operational breathing apparatus. The invention also may be used as an operational system in its own right, under appropriate circumstances.

Emergency situations are best handled by personnel skilled in competent procedures that have been learned through experience and training. The best insurance is good, thorough preparation.

Many emergencies require that the responding personnel be provided breathing apparatus to cope with toxic environments. Fires, chemical leaks, explosive atmospheres and underground operations are obvious critical environments where breathing assistance is needed. In such cases the operator must have confidence in the apparatus and his own ability to operate it safely and effectively. Otherwise, his attention to the task at hand will suffer in the emergency.

For perfect realism, the oxygen breathing apparatus (OBA) itself would be used in training. But, inasmuch as OBA's use oxygen tanks and oxygen generating devices, cost becomes a significant factor when operational apparatus is employed for training.

Therefore, simulation is encouraged. The next best thing to the perfect realism of the apparatus itself is the apparatus, slightly modified for training. That is what the present invention provides, with an insignificant loss of realism.

Oxygen breathing apparatuses (OBA's) for the most part are one-way, closed loop systems which are not vented except by an exhaust valve. The oxygen canister or oxygen generator is removably inserted into a fitting on the OBA that channels the oxygen into inflatable bags from which the user can breath the oxygen on demand. The user's exhaled breath either is vented to the outside, or a portion of it is returned to the system for mixing with the oxygen supply. Outside air is excluded from the system, which is a practice that protects the user from breathing the toxic atmosphere if one is present. An example is the carbon monoxide filled environment that is created during a fire.

For training and other cases in which there is confidence that the only toxic fumes present in the environment are carbon monoxide with or without carbon dioxide, the present invention is appropriate in lieu of typical operational systems. The invention contemplates the modification or replication of the oxygen generating canister of the operational OBA, converting it into a flow-through system of filtering and chemically reactive layers. Together the layers are affective to remove particulates and react with the carbon dioxide in the incoming air to form calcium carbonate. Alteration also is made to the breathing bags such that the supply of breathable air is communicated by tubular conduit from the simulated generator to the user, and the user's exhaled breath is directed into the bags to provide the inflation the bags need for realism in feel and appearance. The conduit also is modified to include a cylinder as a permanent addition whereat carbon monoxide is converted to carbon dioxide.

The prior art includes U.S. Pat. No. 1,808,177 to Putter that discloses an air purifying appliance wherein pendulum breathing and valve-controlled breathing are combined. The pendulum filter may be of activated carbon, silica gel, or soda and lime. U.S. Pat. No. 4,297,117 to Holter et al discloses a fireproof respiratory face mask that has a granular expanded calcium aluminum silicate base coated with layers of soda lime, activated carbon dust, copper dust soaked in a caustic soda solution and manganese dioxide dust held between two layers of ceramic fiber fleece-like material felted together to hold the coated granules. U.S. Pat. No. 4,315,837 to Rourke et al discloses the use of the mixture of metallic oxides available as HOPCALITE from Mine Safety Applicances Corporation to its advantage as a catalyst for the decomposition of ozone, but to do so finely dividing its particles and adhering them to a support matrix for maximum effectiveness. U.S. Pat. No. 4,614,186 to John discloses an emergency breathing survival device having a clear plastic hood for the wearer that supports a canister that is mounted on a mouthpiece and contains a carbon dioxide and water vapor absorbing material, usually consisting of silica gel pellets for removing water vapor and lithium hydroxide pellets for removing carbon dioxide. The mouthpiece directs inhaled air into the mouth, and directs exhaled air through the materials into the hood whereat it is available to the wearer during the emergency as his primary source of air. Some pellets that change color when exposed to moisture are intermingled with the material and are visible through a transparent side wall of the mouthpiece to indicate both before and during use whether the materials have lost their affectiveness. Another system to convert carbon dioxide to carbon monoxide has been developed by others that uses platinum as the active element. The surface area of the platinum is enhanced to maximize its catalytic affect by using it as a coating on porous ceramic pellets. As a catalyst in the system, the platinum does not deteriorate. However, it is part of the canister along with chemicals that are exhaustible. When the exhausted canister is discarded, the platinum is lost or must be removed and recycled.

The prior art in the OBA training field includes the operational equipment itself. It burns an oxygen candle as its source, or uses potassium superoxide to provide the oxygen by reacting with the moisture in the user's exhaled breath and at the same time removing the carbon dioxide from the breath. The user initiates operation of the oxygen-generating canister by pulling on a lanyard that is attached to a cotter pin which holds a spring-loaded striker plate in tension. Removal of the pin allows the plate to strike a shaft that extends into the canister. When struck, the shaft causes the oxygen generator to begin its production of oxygen. A device designed specifically for training is the training canister and system disclosed in U.S. Pat. No. 4,471,774. Starting with an operational OBA the system substitutes a flow-through filter in lieu of the oxygen generating canister, and a cross-over valve in lieu of the fitting into which the operational canister is inserted. The training canister also has an actuator that in appearance and operation is realistic to the trainee, but which is adapted internally to open a valve and allow air to flow through the filter and the cross-over valve to the user. The user's exhaled breath communicates through the other half of the cross-over valve into the bags and is used to inflate them. The bags themselves are not altered from their operational configuration; and, excess pressure is vented from the cross-over valve into the ambient atmosphere. Another prior art training device developed by others converts the tubing that is internal to the bags into a conduit from the canister to the fixture at the facemask. Again exhaled breath is used to inflate the bags. It is with such flow-through systems as the latter device that the invention disclosed herein is compatible.

The prior art fails to provide an apparatus for training that renders practical the use of catalytic platinum in terms of economy, and that can be used to faithfully create for the trainee a realistic experience in the use of an oxygen breathing apparatus in a smoke-filled environment that simulates the one the user can expect to encounter during the emergency for which the trainee is being prepared. The invention overcomes the failure of the prior art with an apparatus that also can be used in an encounter with an operational emergency in an environment where the toxic fumes are known to be limited to carbon monoxide and carbon dioxide. Accordingly, an object of the present invention is to provide a canister and oxygen breathing apparatus simulator to filter and convert the contaminants that are in the ambient atmosphere of the training or operational environment, such that the ambient atmosphere can be safely inhaled and used as the source of oxygen by the user of the canister and simulator. Such an environment or atmosphere is present in training devices whereat burners and smoke generators are employed to simulate emergency scenarios involving fire.

SUMMARY OF THE INVENTION

The present invention is an apparatus comprising a cylinder installed as a section of the continuous tubular conduit used in the adapted breathing bags of a simulated oxygen breathing apparatus (OBA), and a removable filter canister that replicates the oxygen generating canister used by an operational OBA. The cylinder uses activated platinum as a catalyst to remove carbon monoxide from the air entering the apparatus through an aperture in the canister; and, carbon dioxide is removed by a catalytic reaction in the canister. The canister also includes filtration means to remove particulates from the air. Considerations important to the design of an embodiment of the invention include the effectiveness of the apparatus to purify the air, its cost, and the pressure drop. Excess pressure drop would cause the user to have difficulty breathing, and any significant departure from the pressure level that is encountered by a user of an operational OBA would create a training experience that fails in realism.

BRIEF DESCRIPTION OF THE DRAWINGS

The FIGURE is a diagrammatic view partially in cut-away form of an oxygen breathing apparatus (OBA) and training device in accordance with the preferred embodiment, having an internal cylinder for converting carbon monoxide and a removable canister for filtering particulates and converting carbon dioxide.

DESCRIPTION OF A PREFERRED EMBODIMENT

The embodiment shown in the figure may be used for training in the same manner as an oxygen-generating canister is used for operational exercises with an oxygen breathing apparatus (OBA). Since the invention acts as a purifier of the air that passes through it to remove carbon monoxide and carbon dioxide as well as particulates, the embodiment also may be used in an operational role to remove those contaminants in an atmosphere that contains sufficient oxygen for breathing.

The figure shows canister 12 and its contents. Canister 12 outwardly appears to be the removable canister used with an operational OBA, except upon close inspection aperture 14 in the bottom of the canister can be detected. It would not be present if the canister were the one used with the operational OBA. Aperture 14 renders the canister a flow-through device permitting outside air to be drawn up and through canister 12, exiting by way of neck 16. Aperture 14 can be thought of in an operational sense as being equivalent to, and a substitute for, the firing pin of the OBA. Aperture 14 may be located at a position on canister 12 that corresponds to the firing mechanism on the operational oxygen generator, and the spring loaded striker lever, its protective cover and retention cotter pin, and the lanyard connecting the cover to the pin, may be retained. In operation, the user of the operational OBA removes the protective cover, and holding it or the lanyard and pulling, withdraws the cotter pin which is holding the spring loaded lever in a fixed position under tension. The lever is pivotally mounted such that the removal of the cotter pin releases the spring to rotate the lever, driving the firing pin upward into a chlorate candle. In canister 12, the lever may be used to strike and remove a cover to aperture 14.

The incoming air passing through aperture 14 first encounters filter 18 whereat particulated matter is removed. Inlet filter 18 is held in place by springs 20 which support the materials within canister 12 and prevent any substantial movement of chemical 22. Springs 20 also create a chamber below filter 18 into which the air entering aperture 14 may disperse before being drawn into the filter.

Chemical 22 is a catalyst to reduce the amount of carbon dioxide that is present in the air before it is drawn by the user into tubular conduit 24. SODA SORB is a suitable product for use as chemical 22, although other calcium hydroxide or soda lime products may be chosen. However, the pressure drop across the chemical must be considered to maintain a suitable breathing resistance for the user. The catalytic effect of chemical 22 on the air is a reaction that causes the carbon dioxide to make calcium carbonate.

Chemical 22 is capped by outlet filter 26 which removes dust that may have come from the materials contained in canister 12. It may be a fiberglass mat selected from available filter materials for its suitability to perform the intended function. Its selection will depend on its qualification as a particulate filter for the chemicals chosen to be used in the canister. Filter 26 is held a small distance away from the top of canister 12 by standoffs 28 to create plenum 30. Plenum 30 above outlet filter 26 allows air to pass through the filter across its entire surface area. The air passes into the plenum and communicates between or around standoffs 28 to the exit of the canister at neck 16.

Carbon monoxide is removed from the airflow downstream of canister 12, in cylinder 32. Cylinder 32 includes central core 34 into which the incoming air enters from neck 16. Core 34 is capped at its far end to prevent the air from passing down and out the core into tube 36 without passing through converter 38 into outer chamber 39. Accordingly, as air is drawn through the breathing apparatus, it enters core 34 of cylinder 32 and is prevented from following any path to tube 36 except by way of converter 38. Converter 38 may be tubular structure having its downstream end sealed off to cap the far end of core 34, and its upstream end sealed to cylinder 32 adjacent conduit 24 to cap the upstream end of chamber 39. Converter 38 functions as a noble metal catalyst that converts carbon monoxide to carbon dioxide. Platinum is a known converter of carbon monoxide, and it is the metal of choice for the preferred embodiment. Its activated form is preferred to maximize its exposed surface area, and thereby enhance the conversion. Porous ceramic pellets can provide an enormous surface area for hosting the platinum coating, and are suitable for the embodiment.

The converted and filtered air exiting cylinder 32 enters conduit 36. Conduit 36 may include additional filters or converters such as a carbon dioxide catalyst to remove the conversion products of converter 38. Any such additional device that requires service or replacement preferably would be located outside the bags for easy access. Conduit 36 communicates the air along a path such as the circuitous route shown in the figure, to inhalation fixture 40 of facemask 42. Facemask 42, and inhalation fixture 40 and exhalation fixture 44, may be unaltered operational components of a conventional OBA. The route shown in the figure is part of the preferred embodiment because it relates to the tubes that are part of the breathing bags in the operational oxygen breathing apparatus. For purposes of the embodiment the tubes have been modified to be continuous, and have been adapted to convey outside air from the canister to the facemask for inhalation. The tubes in the operational equipment open into the bags and are used to convey air from the bags to the facemask. Unlike the embodiment, the air in the bags of the operational equipment has been provided by an oxygen generator and is stored under pressure in the bags. Other routes may be suitable for conduit 36, but the route shown in the figure is preferred for simulation of an oxygen breathing apparatus like the Navy's OBA Type A4.

The user's exhaled breath departs facemask 42 through exhalation fixture 44 and is conveyed by conduit 46 to the bags at inlet port 48. The user's exhaled breath may be allowed to accumulate within the bags to simulate the inflation caused in the operational apparatus by the oxygen generator. Excess pressure is vented to the outside by the bags' operational pressure relief valve 50.

While the invention has been described with reference to a preferred embodiment, it will be appreciated by those skilled in the art that additions, deletions, modifications, and substitutions or other changes not specified may be made which will fall within the purview of the appended claims.

What is claimed is:

1. A breathing bag apparatus and simulator for providing a supply of breathable air to the inhalation fixture of a facemask and having a continuous conduit within the bags terminating at an inlet port at a first end and at a tubular extension to the inhalation fixture at the second end, wherein said conduit comprises flow-through means for converting carbon monoxide in said air to carbon dioxide, and wherein said apparatus further comprises a removable canister attachable at a neck to said inlet port and having an aperture to the outside atmosphere at the opposite end to form an airflow path internal said canister from said aperture to said neck, comprising internal said canister a first particulate filter transverse said airflow path, and flow-through means for converting carbon dioxide to calcium hydroxide downstream said airflow path from said first particulate filter; and, further wherein said carbon-monoxide-converting means comprises a cylinder having an inner core, an outer chamber and a catalytic converter between said core and said chamber, wherein the inner core of said cylinder is axial with said conduit and open to said conduit at its upstream end, and is closed to said airflow at its downstream end by said converter, and wherein said chamber is closed to said airflow at its upstream end by said converter, and is axial with and open to said conduit at its downstream end, such that air passing from the conduit upstream the cylinder to the conduit downstream the cylinder passes from said core through said catalyst to said chamber.

2. The apparatus of claim 1 wherein said converter comprises pellets coated with a noble metal.

3. The apparatus of claim 2 wherein said noble metal is platinum.

4. The apparatus of claim 3 wherein said pellets are porous ceramic pellets.

5. The apparatus of claim 4 further comprising an inlet fixture on the bags communicating with the exhalation fixture on the facemask, and a pressure relief vent in the wall of the bags, such that the bags are inflated with the user's exhaled breath and are pressure regulated by said vent.

* * * * *